J. J. PELLETT.
Improvement in Sap-Bucket Brackets.
No. 130,863.  Patented Aug. 27, 1872.
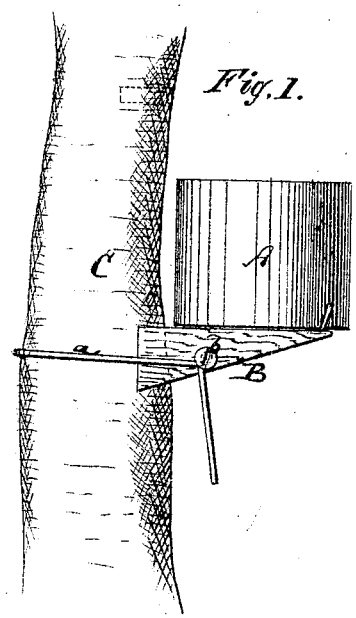
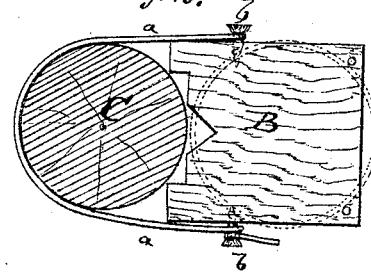
Witnesses:
P. C. Dieterich.
W. A. Graham.
Inventor:
J. J. Pellett
Per Munn & Co.
Attorneys.

UNITED STATES PATENT OFFICE.

JOHN J. PELLETT, OF OCONOMOWOC, WISCONSIN.

IMPROVEMENT IN SAP-BUCKET BRACKETS.

Specification forming part of Letters Patent No. 130,863, dated August 27, 1872.

Specification describing a new and Improved Sap-Bucket Bracket, invented by JOHN J. PELLETT, of Oconomowoc, in the county of Waukesha and State of Wisconsin.

Figure 1 is a side view, and Fig. 2 a top view, of my improved sap-bucket bracket.

Similar letters of reference indicate corresponding parts.

This invention relates to a new manner of supporting buckets on maple trees by means of vertically-adjustable brackets, which are applied thereto, without injuring the trees. The invention consists in the use of the brackets, which are fastened to the trees by means of wires or cords that embrace the same. By this means the buckets can be applied in suitable position and shifted to different heights from year to year, as may be found necessary, and remain always in good order.

A in the drawing represents a sap-bucket of suitable size and shape. B is the bracket, supporting it along the side of the tree C. This bracket is of wood or other material, sufficiently large to support the bucket, and is held to the tree by means of wire or cord *a* that embraces the tree. The ends of the cord or wire *a* are fastened to pins *b b* at the sides or other part of the bracket. The weight of the bucket and its own weight holds the bracket in place. Still, it can at any time be adjusted up or down, or to different sides of the tree. The bracket can remain on the tree from season to season, as it does not injure the tree, nor interfere with its growth.

Having thus described my invention, I claim as new and desire to secure by Letters Patent—

The cord-wire *a* and detachable screws *b b*, combined with a bracket, B, constructed as described.

JOHN J. PELLETT.

Witnesses:
JOEL R. CARPENTER,
DAVID EDWARDS.